United States Patent
Sakashita

(10) Patent No.: US 8,350,873 B2
(45) Date of Patent: Jan. 8, 2013

(54) METHOD OF MAP SCALE CONVERSION OF FEATURES FOR A DISPLAY

(75) Inventor: Naohiro Sakashita, Oobu (JP)

(73) Assignees: DENSO International America, Inc., Southfield, MI (US); Denso Corporation, Kariya-shi, Aichi-ken (JP)

( * ) Notice: Subject to any disclaimer, the term of this patent is extended or adjusted under 35 U.S.C. 154(b) by 808 days.

(21) Appl. No.: 12/498,714

(22) Filed: Jul. 7, 2009

(65) Prior Publication Data

US 2011/0007074 A1 Jan. 13, 2011

(51) Int. Cl.
*G09G 5/34* (2006.01)

(52) U.S. Cl. .................. 345/672; 345/681; 345/682

(58) Field of Classification Search .................. 345/428, 345/660, 666, 667, 672, 681, 682, 684; 701/455, 701/459
See application file for complete search history.

(56) References Cited

U.S. PATENT DOCUMENTS

| | | | |
|---|---|---|---|
| 5,172,102 A * | 12/1992 | Iwamura et al. | ............. 345/667 |
| 7,031,834 B2 | 4/2006 | Ito et al. | |
| 7,088,365 B2 | 8/2006 | Hashizume | |
| 7,164,988 B2 | 1/2007 | Kato | |
| 7,225,077 B2 | 5/2007 | Kouchiyama | |
| 2005/0001849 A1 * | 1/2005 | Arcas | ............. 345/428 |
| 2006/0112350 A1 * | 5/2006 | Kato | ............. 715/781 |
| 2008/0306684 A1 | 12/2008 | Yamazaki | |

FOREIGN PATENT DOCUMENTS

| | | |
|---|---|---|
| JP | 07-190789 | 7/1995 |
| JP | 07-190790 | 7/1995 |
| JP | 11-258977 | 9/1999 |
| JP | 2008-304246 | 12/2008 |

* cited by examiner

*Primary Examiner* — Jeffery A Brier
(74) *Attorney, Agent, or Firm* — Harness, Dickey & Pierce, P.L.C.

(57) ABSTRACT

A method of controlling a vehicle navigation system may entail inquiring if the navigation system is displaying a road map in a first map scale on a display, inquiring if a scrolling feature was used to pan the road map in the first map scale on the display to a specific scrolled point, concluding that the scrolling feature was used, calculating a detail road display area based on the specific scrolled point of the display; loading detailed road link data in a second map scale from memory of the navigation system, the detailed road link data corresponding in actual geographic area to the detail road display area, converting the detailed road link data from the second map scale to the first map scale to create converted detail road link data, and displaying the converted detail road link data together with the road map in the first map scale.

17 Claims, 4 Drawing Sheets

METHOD OF MAP SCALE CONVERSION OF FEATURES FOR A DISPLAY

FIELD

The present disclosure relates to scrolling a navigation system display, retrieving map features, converting the map scale of the features and displaying the converted scale map features on the display.

BACKGROUND

This section provides background information related to the present disclosure which is not necessarily prior art. Navigation systems, such as those installed in vehicles including automobiles, are known in the art but are not without their share of limitations. One limitation exists because vehicle navigation systems contain a large amount of map data that must be viewed at a prescribed map scale, such as a relatively large scale (e.g. 1 inch=700 feet (213.4 meters)), to make the map data, such as residential streets and corresponding residential street names, legible on a display to a map viewer. This is a limitation because when the navigation system user wants to view map data on a different area of the map, such as a map area that is not presently viewable on the display, the user must change the map scale to a relatively small scale (e.g. 1 inch=0.25 mile (1,320 feet or 402.3 meters)), to reveal a relatively large map area on the display, which contains no map details except for major highway roads for instance, and then scroll or pan toward the specific area desired to be viewed. Thus, upon the user scrolling to an area that is desired to be viewed, the user must again change (i.e. zoom) the map scale to a large map scale (e.g. 1 inch=700 feet) to confirm the area or point of interest that the user desires to view. If the area, upon enlarging the scale, reveals itself as not the area intended to view, the user must change the map scale again to a small map scale (e.g. 1 inch=0.25 mile (1,320 feet or 402.3 meters)) and scroll the map in an effort to find the desired map area. Such operations zoom-in and zoom-out operations must be continued until the user finds the area or point of interest on the map.

What is needed then is a navigation system that does not suffer from the above limitations.

SUMMARY

This section provides a general summary of the disclosure, and is not a comprehensive disclosure of its full scope or all of its features. A method of controlling a navigation system in a vehicle may entail inquiring if the navigation system is displaying a road map in a first map scale (such as a small map scale) on a display; concluding that the navigation system is displaying the road map in the first map scale on the display; inquiring if a scrolling feature (panning feature) was used to pan the road map in the first map scale on the display to a specific scrolled point; concluding that the scrolling feature was used to pan the road map in the first map scale on the display to a specific scrolled point; calculating a detail road display area based on the specific scrolled point of the display; loading a detailed road link layer in a second map scale (such as a large map scale) from memory of the navigation system, the detailed road link layer corresponding in area to the detail road display area; converting the road details, such as residential streets and residential street names, of the detailed road link layer from the second map scale to the first map scale to create converted detail road link data in the small map scale (first map scale); and displaying the converted detail road link data in the first map scale on the display together with the road map (roads, geographical features) in the first map scale.

Moreover, the method may entail inquiring, after user scrolling, if three seconds have passed and no navigation system operations have been performed (or attempted to be performed by a navigation system user), and inquiring if all the converted detail road link data in the first map scale on the display together with the road map in the first map scale has been loaded. The first map scale may be a smaller map scale (features look smaller on the display) than the second map scale, which may be a larger map scale (features look larger on the display relative to the first map scale).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
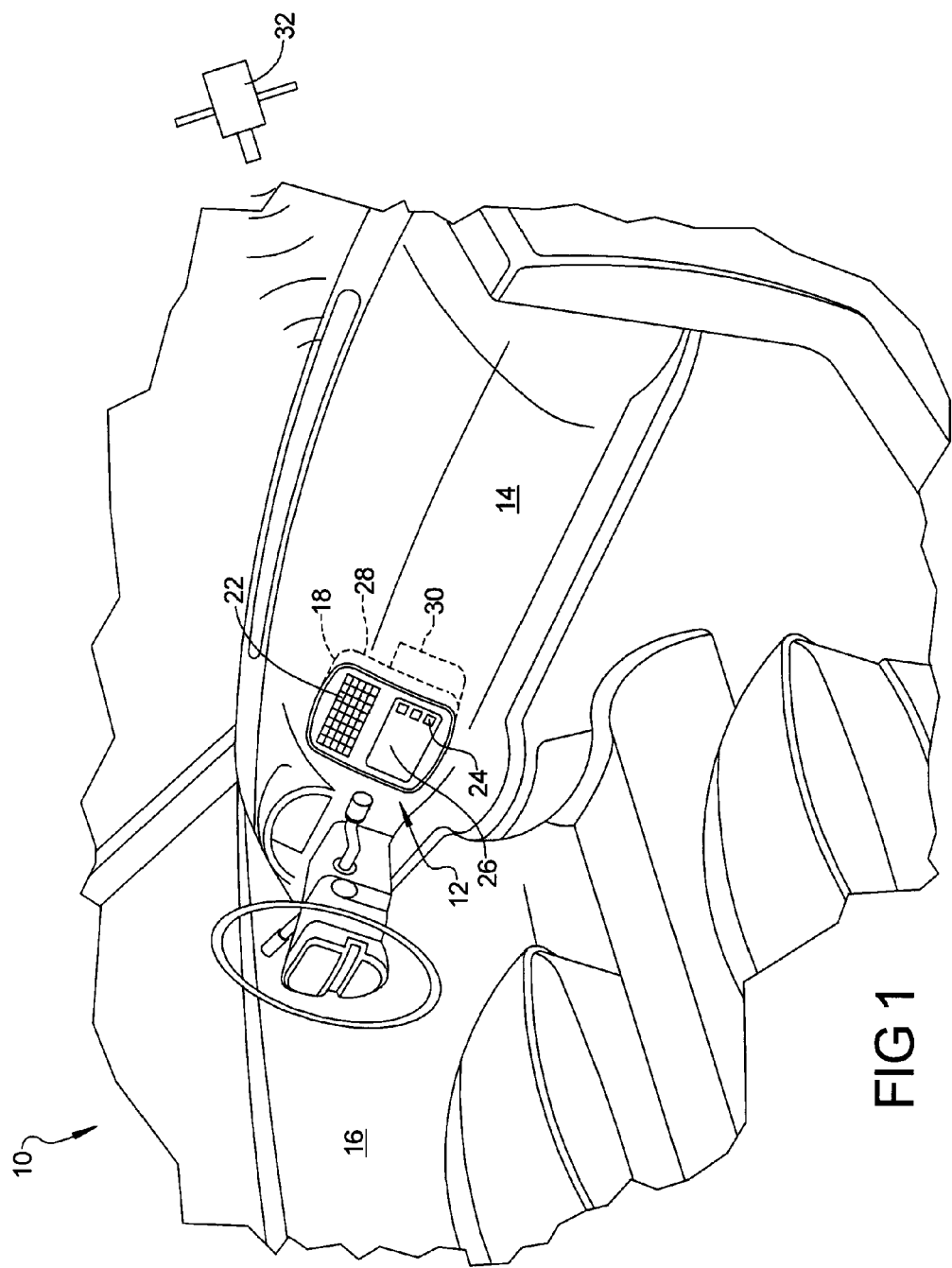
FIG. 1 is a perspective view of part of a vehicle and a vehicle interior depicting a location of a navigation system.

With reference to FIGS. 1-5, details of the invention will now be presented. FIG. 1 depicts a vehicle 10 that employs a navigation system 12, which may be mounted in a dash 14 of the vehicle interior 16. The navigation system 12 may employ a navigation control unit 18 that computes route data, such as a route that a vehicle is traveling or is recommended to travel, and displays such route data on a navigation system display 26. The navigation control unit 18 may determine the position of the vehicle 10 relative to a destination address that may be entered into the navigation system using physical buttons 22 or a touch screen feature 24 of the display 26 of the navigation system to provide visual driving directions on the display 26 and audible driving directions to explain to the driver how to successfully navigate to the destination address. The navigation control unit 18 may also include a memory 28 with a memory feature that permits the driver of the vehicle to store frequently used destination addresses, such as a home address, business address, or a work address. These stored addresses may be temporarily viewable on the display 26 when accessing or using the memory feature. Memory features and programming features of the navigation system may be accessed using one or more buttons 22 on the dash or as part of the touch screen 24 such as around a periphery of the display 26. The navigation control unit 18 may cooperate with a Global Positioning System (GPS) module 30, which in turn may bilaterally communicate with a GPS satellite 32 to display a location of the vehicle 10 on display 26. The navigation module 30 determines a location of the vehicle 10 according to data received from the GPS satellite 32.

Figure 2:
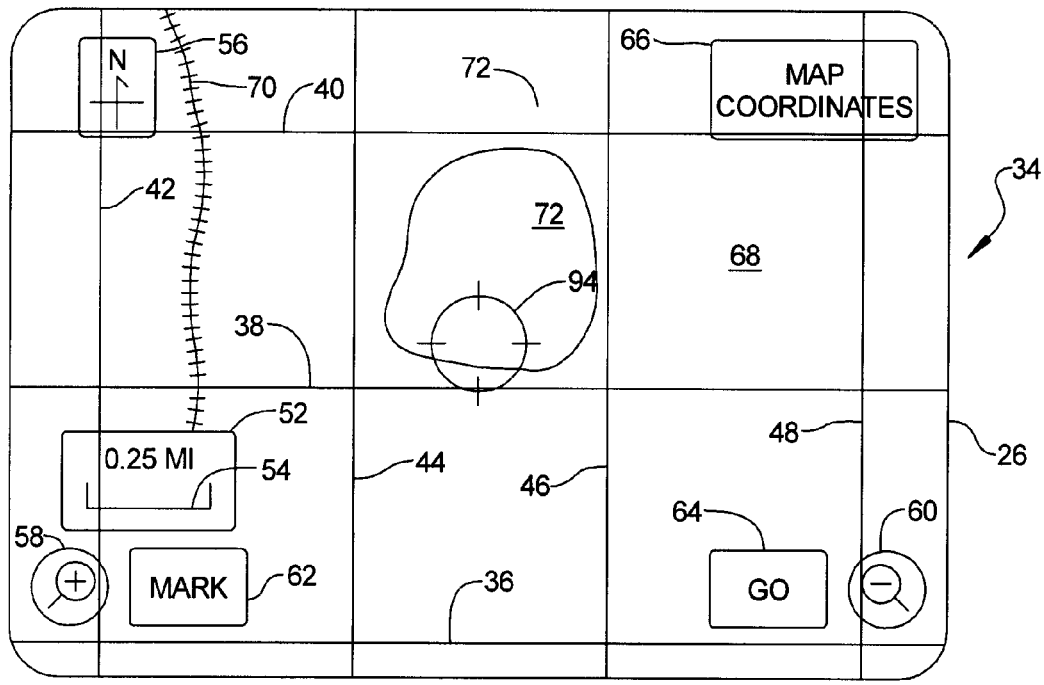
FIG. 2 is a view of a navigation system display depicting an area at a map scale of 0.25 mile.
Figure 3:
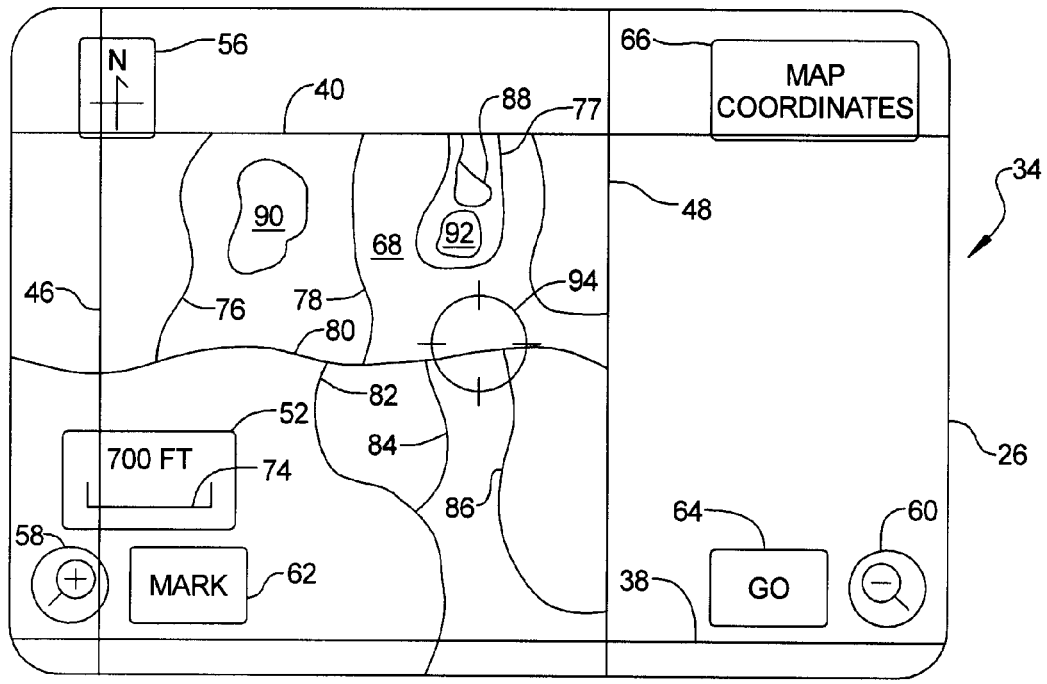
FIG. 3 is a view of a navigation system display depicting a residential street area at a map scale of 700 feet.

With reference turning to FIGS. 2 and 3, the display 26 of the navigation system may offer other features, such as a "North" Indicator 56, a "Map Coordinates" button 66, a "Mark" button 62 and a "Go" button 64. North indicator 56 merely indicates a northerly direction relative to the map on display 26, "Map Coordinates" button 66 may display the latitude and longitude, for example, of the position of cursor 94 relative to the actual physical location that is displayed on the map 34, "Mark" button 62 may be contacted to store a particular location into memory 28 of the navigation system 12 and "Go" button 64 may be contacted on display 26 to calculate a route and indicate the route on display 26 after a user manually inputs an address or destination. Moreover, a "zoom in" button 58 and a "zoom out" button 60 may permit a user to enlarge and reduce a depicted size of the roads and geographical features depicted on the screen. Of course such "buttons" 58, 60, 62, 64, 66 may be touch-screen areas on navigation system display 26 or actual physical buttons 22.

Continuing with reference to FIG. 2, navigation system map 34 in a first scale, such as 0.25 ml (mile) scale, as an example, is depicted. Navigation system map 34, in additional to depicting a physical, geographical area on the surface of Earth, may also depict a series of roads 36, 38, 40 depicted horizontally and roads 42, 44, 46, 48 depicted vertically on display 26. To effectively estimate distances along, between or relative to roads 36, 38, 40, 42, 44, 46, 48, scale box 52 may be referenced by a viewer to obtain the scale of the map displayed on map 34 of display 26. For instance, the physical length of scale line 54 may represent a distance that is relative to that of map 34. More specifically, the length of scale line 54, when overlaid or compared to geographic map 34 of display 26, corresponds to an actual distance of 0.25 miles on the Earth. Thus, as an example, if the perpendicular distance between vertical road 44 and vertical road 46 is 2.5 times the length of scale line 54, then the perpendicular distance between road 44 and road 46 is 0.625 miles ((2.5)*(0.25 miles)). A distance of 0.25 miles equals about 402.2 meters.

Turning to FIG. 3, a second example of display 26 is depicted in which a portion of the same geographical area or map 34 of FIG. 2 is displayed at a different scale. For instance, area 68 of map 34 in FIG. 2 is displayed as a largely blank or empty area in 0.25 mile scale. Thus, at such a scale or zoom level (0.25 map scale), only large geographic features are visible on display 26. For instance, FIG. 2 clearly depicts a railroad track 70 and a relatively large lake 72 (larger than 0.25 miles in diameter according to the depicted scale), but smaller features, such as residential roads and smaller bodies of water may not be visible at 0.25 scale of FIG. 2. Such is the case of features within area 68 of FIG. 2 because the area 68 actually features a multitude of residential roads and water features, which are visible in FIG. 3 at a 700 feet map scale.

Continuing with FIG. 3, the 700 feet map scale means that the length of scale line 74 represents or equals 700 feet (213.3 meters) on any portion of the map 34 displayed in FIG. 3. Moreover, small features, such as residential streets and bodies of water that are approximately 350 feet in diameter, are not visible in area 68 of FIG. 2, but are visible in area 68 of FIG. 3. Thus, when map 34 is viewed at a scale of 700 feet, as depicted in FIG. 3, residential streets 76, 77, 78, 80, 82, 84, 86 become visible to a user. Other features, such as cul-de-sac 88 and ponds 90, 92 also become visible at a map scale of 700 feet.

Thus, if viewed individually and at separate times, a vehicle navigation system user may first view map 34 at a scale of 0.25 miles and then zoom to map scale 700 feet, as depicted in FIG. 3. To zoom in and display a scale of 700 feet, a user would simply touch zoom-in button 58, and to zoom out to a scale of 0.25 miles, a user would simply touch zoom-out button 60. Zooming in and out may be relative to a center portion of the screen, that is, at an intersection of a vertical midpoint and a horizontal midpoint, as indicated by cursor 94, which may remain in the center of the display 26 at all times. Thus, to "zoom in" on area 68, a user would simply touch a surface of the screen of display 26 in area 68 and area 68 would begin and continue moving, at the existing or current scale, toward cursor 94 in the center of the display 26 until the user lifted his or her fingertip from the surface of the display 26. Next, the user may touch zoom-in button 58 to enlarge the features on the screen such that a distance measured across the display surface represents a smaller area of actual geography (e.g. from 1 inch=0.25 miles to 1 inch=700 feet). Thus, what is viewed in FIG. 3 may be a result of panning and then zooming from what is viewed in FIG. 2.

In one scenario, a user may view a map in 0.25 mile scale and then pan and zoom to 700 feet scale in order to view details such as residential roads or other relatively small features; however, if zooming to 700 feet scale from 0.25 mile scale was done at the incorrect location or not quite on target with the area a user desired to view, then the user would have to zoom out again by contacting the zoom out button 60 and panning closer to the desired location and then zoom in once again. Such zooming in and zooming out may take several iterations, consume an undesirable amount of time, and be a distraction within a vehicle interior for occupants. In an alternative, upon zooming the first time to a 700 feet scale map, the user could pan at such scale to reach the final area for viewing; however, because the level of detail in 700 feet scale is extensive, the microprocessor or core processor of the navigation control unit 18 may take an unacceptable amount of time to constantly load the 700 feet scale map with the road details available at 700 feet scale as panning occurs. The more detail that is displayed, the more slowly the loading and panning process becomes. Loading may be from a HDD or DVD into random access memory.

Figure 4:
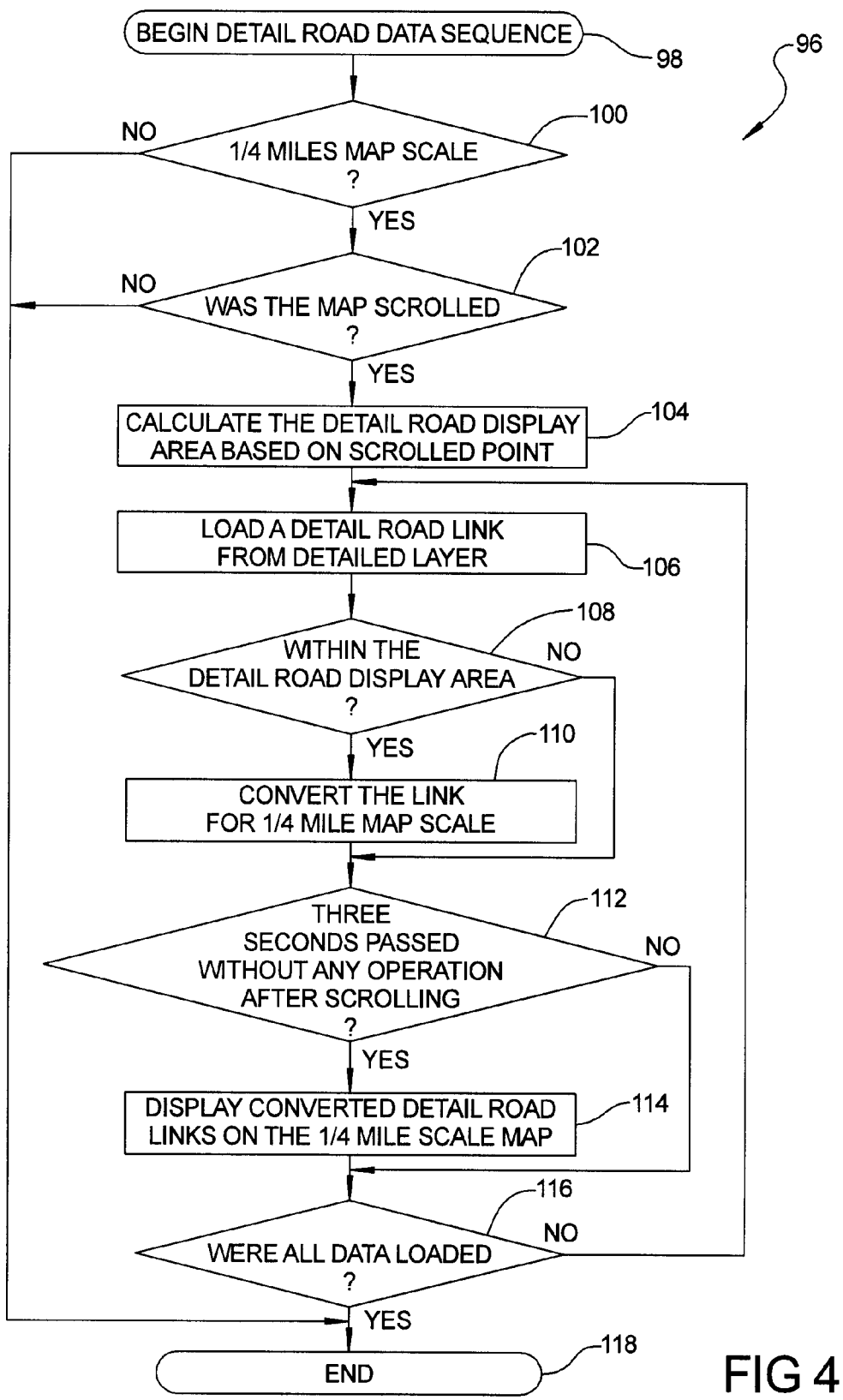
FIG. 4 is a flowchart of logic for displaying a detail road view on a navigation system display.

As an alternative to panning—zooming-in—zooming out—panning—zooming-in and panning on a high detail scale screen, such as 700 feet scale, the logic of FIG. 4 will be presented. FIG. 4 is a flowchart of control logic 96 for causing display of detailed map data on a navigation system display 26 while minimizing the time to display the detailed information, such as residential streets. Beginning at step 98, the logic immediately proceeds to step 100 where the logic enquires whether the display 26 is displaying a map in 0.25 mile map scale. If the reply is "no," the logic ends and may then immediately begin again; however, if the reply is "yes," then the logic proceeds to step 102 where the logic inquires "was the map scrolled?" If the reply is "no," the logic ends and may then immediately begin again; however, if the reply is "yes," then the logic proceeds to step 104.

At step 104, the logic calculates the detail road display area based on the scrolled point. Thus, at step 104, and with the navigation system displaying road data in 0.25 mile map scale, the navigation control unit 18 will calculate (e.g. determine) an area of all map features in the display 26 at 0.25 mile map scale to 700 feet map scale. Calculating a detail road display area may be performed at a variety of map scales, such as at whatever map scale happens to be displayed during use by a user; however, another or different map scale must exist that will permit further "zooming-in" to permit more detailed information to be viewed than the currently viewed screen or the map scale that happens to be displayed. For example, example map scales selectable by a user may be 150 feet, 300 feet, 700 feet, 0.25 mile, 0.5 mile, 1 mile, 2 mile, 4 mile, 8 mile, 16 mile, 30 mile, 60 mile, 130 mile and 250 mile. Thus, if a user wants to calculate a detailed road display area based on a point "panned to" or "scrolled to" on the screen, in accordance with step 104, he or she must select a map scale from 300 feet to 250 mile, inclusive. By selecting a map scale in such a range, inclusive, a map scale capable of showing greater (larger) detail is possible. For instance, if a map scale of 1.0 mile is displayed, displaying a map scale depicting larger and clearer details is possible, such as 0.5 mile, 0.25 mile, 700 feet, 300 feet, etc. Thus, step 104 may calculate an area to be re-scaled (made larger) as equal to the area depicted or displayed on display 26 in the current scale (0.25 mile scale), which is larger than the new scale to be depicted. When the display 26 then displays the scale depicting greater details (e.g. 700 feet scale from 0.25 mile scale), not all of the calculated and enlarged area will be capable of being displayed on display 26 at the same time. Thus, a user may have to pan or scroll to view the desired area, as will be discussed in a step below.

Continuing with the control logic 96, at step 106, data pertaining to a detail road link from a detailed data layer is loaded, such as into RAM memory from a source, to subsequently be displayed on the display 26. Throughout the specification, references to a "layer" or "data layer" may simply be data, such as road data (links), geographical data, topographical data, or data pertaining to man-made features such as buildings, etc. Loading the data from a source may mean loading data from a map digital video disk ("DVD"), a hard disk drive ("HDD"), a memory card or similar memory medium and into RAM memory, so that when data is loaded, it is loaded from a memory source capable of retaining more data than the RAM memory, for example. A "road link" is road data, such as a single road or a collection of connected or "linked" roads, such as may be loaded from an HDD, DVD or memory 28 of the navigation control unit 18. The features that are displayable on a navigation system screen 26 may be man-made features such as roads, buildings, bridges, etc. and natural features, such as rivers, lakes, ponds, mountains, etc. Regardless of the features or information (store names, street names, etc.) displayable, such features and information may be stored on different "layers" in memory. Such different layers may be groups of data that pertain to different memory locations that are organized by the type of information stored at such location, the level of detail, or size or scale of the data information. A "layer" or "data layer" may be synonymous with "data." For instance, in one example roads may be categorized as AC1, AC2, AC3, AC4, and AC5. As examples, AC1 may be freeways, AC2 may be highways, AC3 may be four lane roads, AC4 may be two lane roads (primarily non-residential), and AC5 may be residential streets. Thus, streets may be categorized in a variety of ways (e.g. width, number of vehicle lanes, vehicle carrying capacity, speed limit, etc.).

Continuing with the control logic 96 of FIG. 4, after loading a detail road link from the detailed layer of RAM memory 28 of the navigation control unit 18 in step 106, the logic moves to step 108. At step 108, the logic inquires whether the road link (e.g. an AC5 road converted from the 700 feet map) is within the display area of the display 26 or out of the display area of display 26. The road link, which may be a road that the navigation system user desires to view, may or may not actually be displayed on display 26 of the navigation system because the entire display of geographic information (i.e. roads, stores, lakes, etc.) as displayed in the 0.25 mile scale may be converted from 700 feet scale to 0.25 mile scale. Thus, step 108 is a check to evaluate whether the road link (AC5 road that is converted from 700 feet scale) will fit in the area of display 26 or out of the area of display 26. With panning or scrolling, all converted geographic information is viewable on display 26.

After the inquiry at step 108, if the reply is "no," then the logic proceeds to the inquiry at step 112; however, if the reply is "yes" at step 108, then the logic proceeds to step 110 where the road link (i.e. series or collection of roads) is converted for 0.25 map scale; that is, details that are visible on a 700 feet map scale map, are adjusted or converted (i.e. scaled) to fit into a 0.25 map scale map; however, no converted data (e.g. geographic information such as roads, buildings, lakes, etc.) are yet displayed on display 26. Instead, the detail geographic information will be held in memory until its display is required by the user, as will be discussed later.

After conversion (scaling) and storage in memory of the road links at step 110, the logic proceeds to step 112. At step 112, the logic inquires if three (3) seconds have passed without any operation (e.g. physical contact), by a human, of the navigation system after scrolling or panning to the present scroll or pan point indicated by center 94 of display 26. If the reply to such inquiry is "no," then the control proceeds to step 116; however, if the reply to such an inquiry is "yes," then the logic proceeds to step 114. Thus, when the reply is "yes," a navigation system user may intentionally not touch any aspect of the navigation system for at least three seconds to cause control to pass to step 114.

At step 114, the control logic may display the converted detail road links on the 0.25 mile scale map. Thus, as step 114, a navigation system user becomes able to see details on the 0.25 mile scale map that previously were not visible on the 0.25 mile scale map, such as AC5 level roads, which are residential roads. While the AC5 level roads may appear relatively small on the 0.25 mile scale map, they will assist the viewer in finding a particular road and may prevent additional panning-zooming to and from different map scales.

At step 116, the control logic inquires if all data, that is, the converted detail road links, has been loaded into memory and displayed on display 26. If the reply to such inquiry is "yes," then the logic proceeds to end at step 118, after which the routine may again begin at step 98. However, if not all data (i.e. road links) has been loaded, then the logic returns to step 106 and proceeds again as discussed above.

Figure 5:
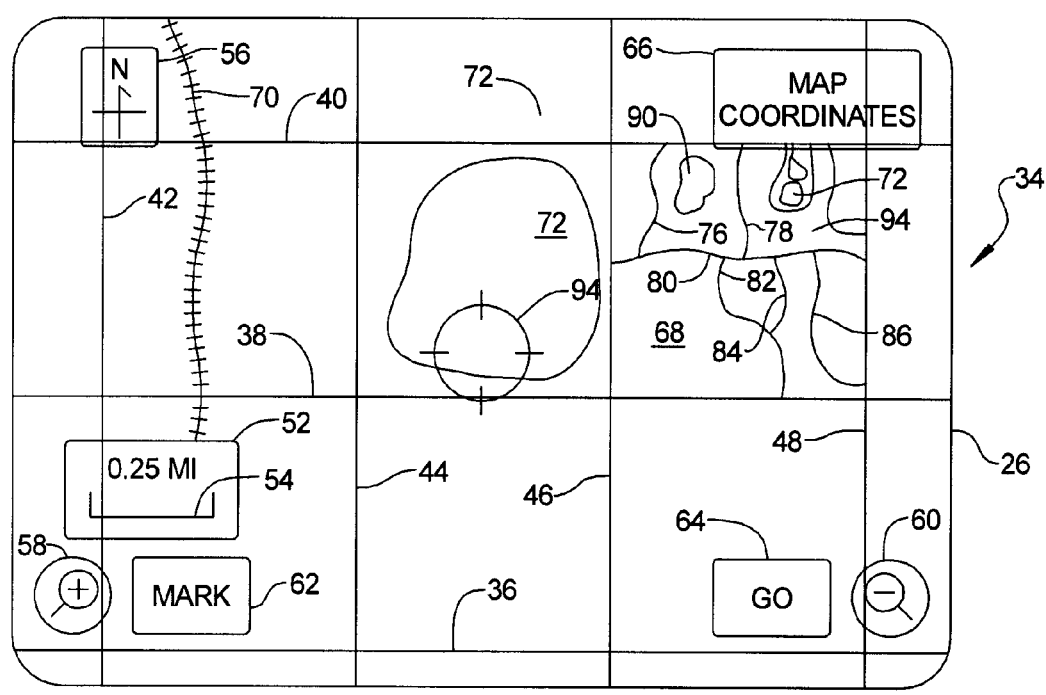
FIG. 5 is a view of a navigation system display depicting a specific residential street area from FIG. 3 converted to 0.25 mile map scale and combined with the map features of FIG. 2.

FIG. 5 is a view of the navigation system display 26 depicting a specific residential street area 68, as a representative example, from FIG. 3 and converted from 700 feet map scale to 0.25 mile map scale and combined with the balance of FIG. 2 to display all features in 0.25 mile map scale. The entire display of FIG. 5 may show AC5 level road data and features, if they exist. FIG. 5 depicts the converted detailed residential streets from a first scale (e.g. 700 feet map scale) to a second scale (e.g. 0.25 mile map scale) to depict details such as residential streets on a map that otherwise does not depict details such as residential streets. The converted map of FIG. 5 permits panning of details such as AC5 road links without having to zoom in to view residential streets and then zoom out to view larger geographical areas in a smaller map scale, before zooming in yet again to a larger map scale to view the residential streets. Thus, conversion of details from a first map scale to a second map scale for subsequent display on a map consisting of features at the second map scale is possible, even when the second map scale is a smaller map scale than the first map scale. The total display area of display 26 (FIG. 2) may be converted and not just a portion, such as area 68, of the display.

Described in more functional language, a method of controlling a navigation system 12 may entail inquiring if the navigation system 12 is displaying a road map (e.g. roads 36, 38, 40, 42, 44, 46) in a first map scale (e.g. 0.25 mile map scale) on a display 26 (step 100); concluding that the navigation system 12 is displaying the road map in the first map scale on the display 26; inquiring if a scrolling feature (e.g. a panning feature invoked by a user sliding a finger across the display 26) was used to pan the road map in the first map scale on the display 26 to a specific scrolled point (e.g. as depicted in FIG. 2) (step 102); concluding that the scrolling feature (panning feature) was used to pan the road map in the first map scale on the display 26 to a specific scrolled point (step 102); and calculating a detail road display area based on the specific scrolled point of the display 26. More specifically, calculating a detail road display area may entail determining the expanse and extent of roads presently displayed on display 26. For instance, all portions of the roads 36, 38 40, 42, 44, 46 that are visible in FIG. 2, and the areas formed by their intersection, may be the calculated detail road display area. Although roads may exist within the enclosed areas (e.g. area 68) formed by roads 36, 38 40, 42, 44, 46, such roads may not be visible because of the small scale (e.g. 0.25 mile map scale) of the navigation system map 34. Continuing, the actual size (e.g. in square miles, square feet, square kilometers, square meters, etc.) of the actual earthen area depicted in FIG. 2, may be calculated as the area from which to form the detail road display area. The area may also be calculated as being smaller or larger than the actual earthen area depicted in FIG. 2.

Moreover, the method may entail loading a detailed road link layer in a second map scale (e.g. see FIG. 3 in 700 feet map scale) from memory 28 of the navigation system 12. The data or road links (i.e. roads and their connection(s)) stored in memory 28 of the navigation system 12 may be thought of as being stored in layers, with different levels of detail on each layer with possibly increasingly higher levels of detail on each successive layer and/or simply different types of details on different layers. A layer may be a memory location or division. For instance, a specific type of road may be on specific layers, while types of stores or businesses may be on specific layers in the memory. The detailed road link layer (e.g. a layer such as an AC5 layer that depicts residential streets) may correspond to, that is, be the same size as, the calculated detail road display area.

Continuing, the method may entail converting the detailed road link layer from the second map scale to the first map scale to create a converted detail road link layer (i.e. detail data). This step of converting may entail retrieving residential road data, or any more specific and more detailed data regarding map 34 than that which is currently displayed for a user. Converting may further entail moving the detailed information, such as the residential or more detailed roads (e.g. what is displayed in FIG. 3), from the larger scale (e.g. 700 feet map scale) to the smaller map scale (e.g. 0.25 mile map scale of FIG. 2) in memory in preparation for displaying detailed roads from the 700 feet map scale and roads from 0.25 mile map scale together on the 0.25 mile map scale map. Additionally, converting may further entail changing the scale of the detailed roads from 700 feet map scale to 0.25 mile map scale so the converted roads and features will fit, from a scale and size perspective, into the 0.25 mile map scale map. The step of displaying the converted detail road link layer in the first map scale on the display 26 together with the road map in the first map scale may then be performed so that the user may view the more detailed roads on the map that is of a smaller scale. The advantage of this aspect of the invention is that a limited area of the map 34 may be converted from a large scale (e.g. the detailed layer of residential roads of FIG. 3) to a smaller scale map such as FIG. 2. While the details will have been converted (reduced in size) when displayed on display 26, such will permit a user to see details for a limited area without zooming in and out to find particular map details, such as a residential street. Thus, the detailed road link layer may be a second map scale and the first map scale may be a smaller map scale than the second map scale.

The method may further entail, after inquiring if a scrolling feature (panning feature) was used to pan the road map in the first map scale on the display 26 to a specific scrolled point (step 102), inquiring if three seconds have passed and no navigation system operations have been performed (i.e. the user is waiting for automatic conversion to display detail roads. Additionally, the method may entail inquiring if all data in the converted detail road link layer has been loaded into memory 28.

The method may entail calculating a detail road display area that is larger than that displayed in the display in the first map scale so that more actual area may be converted than what is originally displayed, and converting an area of the detailed road link layer from the second map scale that is larger than that displayed in the display in the first map scale. Similarly, the method may entail calculating a detail road display area that is equal in real area as that displayed in the display in the first map scale, and converting an area of the detailed road link layer from the second map scale that is equal in real area as that displayed in the display in the first map scale. The method may then involve the step of determining if the detailed road link data is within the display area. If so, the user will have the advantage of being able to scroll and pan a geographical area that is equal to the actual geographical area depicted in FIG. 2. If desired, a larger area than what is depicted in FIG. 2 may be converted to display more detailed roads (e.g. roads that are visible at 700 feet map scale) on a 0.25 mile map scale. An advantage of converting an area of detail that is actually larger than the area that is originally viewed (FIG. 2) is that if the user scrolls again after viewing the combined screens (FIG. 2 plus the detail layer loaded and displayed with FIG. 2), more details will be readily available, as opposed to the navigation control unit 18 having to load additional details from a detailed layer, which may cause a viewer to wait for loading and conversion from memory.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A method of controlling a navigation system comprising:
    inquiring if the navigation system is displaying a road map in a first map scale on a display;
    concluding that the navigation system is displaying the road map in the first map scale on the display;
    inquiring if a scrolling feature (panning feature) was used prior to concluding that the navigation system is displaying the road map in the first map scale to pan the road map in the first map scale on the display to a specific scrolled point;
    concluding that the scrolling feature was used prior to concluding that the navigation system is displaying the road map in the first map scale to pan the road map in the first map scale on the display to a specific scrolled point;
    calculating a detail road display area based on the specific scrolled point of the display;
    loading detailed road link data in a second map scale greater than the first map scale from memory of the navigation system, the detailed road link data corresponding to the calculated detail road display area;
    determining if the detail road link data will fit on the display;
    converting the detailed road link data from the second map scale to the first map scale to create converted detail road link data only after determining that the converted detail road link data will fit on the display; and
    displaying the converted detail road link data in the first map scale on the display together with the road map in the first map scale when it is determined that the detailed road link data will fit on the display.

2. The method of claim 1, wherein:
    the detailed road link data is in a second map scale; and
    the first map scale is a smaller map scale than the second map scale.

3. The method of claim 1, further comprising:
    inquiring if all data in the detail road link data has been loaded into memory.

4. The method of claim 1, wherein:
    calculating a detail road display area based on the specific scrolled point of the display further comprises:
        calculating a detail road display area that is larger than that displayed in the display in the first map scale; and
    converting the detailed road link data from the second map scale to the first map scale to create converted detail road link data further comprises:
        converting an area of the detailed road link data from the second map scale that is larger than that displayed in the display in the first map scale.

5. The method of claim 1, wherein:
    calculating a detail road display area based on the specific scrolled point of the display further comprises:
        calculating a detail road display area that is equal in real area as that displayed in the display in the first map scale; and
    converting the detailed road link data from the second map scale to the first map scale to create converted detail road link data further comprises:
        converting an area of the detailed road link data from the second map scale that is equal in real area as that displayed in the display in the first map scale.

6. The method of claim 1, wherein the scrolling feature inquiring step is only performed after concluding that the navigation system is displaying the road map in the first map scale.

7. A method of controlling a navigation system comprising:
    inquiring if the navigation system is displaying a first road map in a first map scale on a display in a first level of detail;
    concluding that the navigation system is displaying the road map in the first map scale on the display;
    inquiring whether a second road map in a second map scale greater than the first map scale exists in a memory;
    concluding that the second road map in the second map scale exists in the memory;
    inquiring if a scrolling feature was used prior to concluding that the navigation system is displaying the road map in the first map scale to pan the road map in the first map scale on the display to a specific scrolled point;
    concluding that the scrolling feature was used prior to concluding that the navigation system is displaying the road map in the first map scale to pan the road map in the first map scale on the display to a specific scrolled point;
    calculating a detail road display area based on the specific scrolled point of the display;
    loading detailed road link data in the second map scale from memory of the navigation system, the detailed road link data corresponding to the calculated detail road display area;
    determining if the detail road link data will fit on the display;
    converting the detailed road link data from the second map scale to the first map scale to create converted detail road link data only after determining that the converted detail road link data will fit on the display; and
    displaying the converted detail road link data in the first map scale on the display together with the road map in the first map scale when it is determined that the detailed road link data will fit on the display.

8. The method of claim 7, further comprising:
    inquiring, after scrolling, if three seconds have passed and no navigation system operations have been performed by a human user.

9. The method of claim 8, further comprising:
    inquiring if all data of the converted detail road link data in the first map scale on the display, together with the road map in the first map scale, has been loaded into a memory.

10. The method of claim 9, wherein converting the detailed road link data from the second map scale to the first map scale to create converted detail road link data further comprises:
    converting an area of the detailed road link data from the second map scale that is larger than that displayed in the display in the first map scale.

11. The method of claim 9, wherein converting the detailed road link data from the second map scale to the first map scale to create converted detail road link data further comprises:
    converting an area of the detailed road link data from the second map scale that is equal in size as that displayed in the display in the first map scale.

12. The method of claim 7, wherein the scrolling feature inquiring step is only performed after concluding that the navigation system is displaying the road map in the first map scale.

13. A method of controlling a navigation system comprising:
    inquiring if the navigation system is displaying a road map in a first map scale on a display;
    concluding that the navigation system is displaying the road map in the first map scale on the display;

inquiring if a scrolling feature was used prior to concluding that the navigation system is displaying the road map in the first map scale to pan the road map in the first map scale on the display to a specific scrolled point;

concluding that the scrolling feature was used prior to concluding that the navigation system is displaying the road map in the first map scale to pan the road map in the first map scale on the display to a specific scrolled point;

calculating a detail road display area based on the specific scrolled point of the display;

loading detailed road link data in a second map scale greater than the first map scale from memory of the navigation system, the detailed road link data corresponding to the detail road display area;

determining if the detailed road link data will fit on the display;

converting the detailed road link data from the second map scale to the first map scale to create converted detail road link data only after determining that the detailed road link data will fit on the display;

inquiring, after scrolling, if three seconds have passed and no navigation system operations have been performed; and displaying the converted detail road link data in the first map scale on the display together with the road map in the first map scale when it is determined that the detailed road link data will fit on the display.

14. The method of claim 13, wherein the first map scale is a smaller scale than the second map scale.

15. The method of claim 14, wherein converting the detailed road link data from the second map scale to the first map scale to create converted detail road link data further comprises:

converting an area of the detailed road link data from the second map scale that is larger than that displayed in the display in the first map scale.

16. The method of claim 14, wherein converting the detailed road link data from the second map scale to the first map scale to create converted detail road link data further comprises:

converting an area of the detailed road link data from the second map scale that is the same size as that displayed in the display in the first map scale.

17. The method of claim 13, wherein the scrolling feature inquiring step is only performed after concluding that the navigation system is displaying the road map in the first map scale.

* * * * *